(12) United States Patent
Okachi

(10) Patent No.: US 7,185,108 B1
(45) Date of Patent: Feb. 27, 2007

(54) INFORMATION PROCESSING APPARATUS HAVING REPLY PRIORITY AND METHOD THEREOF

(75) Inventor: Yuji Okachi, Tokyo (JP)

(73) Assignee: Sony Corporation, Tokyo (JP)

( * ) Notice: Subject to any disclaimer, the term of this patent is extended or adjusted under 35 U.S.C. 154(b) by 770 days.

(21) Appl. No.: 09/688,429

(22) Filed: Oct. 16, 2000

(30) Foreign Application Priority Data

Nov. 5, 1999 (JP) .............................. P11-315901

(51) Int. Cl.
*G06F 15/173* (2006.01)
(52) U.S. Cl. .................. 709/240; 709/207; 709/242
(58) Field of Classification Search ................ 709/206, 709/207; 706/12; 707/3
See application file for complete search history.

(56) References Cited

U.S. PATENT DOCUMENTS

| 5,963,632 | A | 10/1999 | Miloslavsky |  |
|---|---|---|---|---|
| 5,966,437 | A | 10/1999 | Cox et al. |  |
| 6,226,377 | B1* | 5/2001 | Donaghue, Jr. | 379/265.13 |
| 6,377,944 | B1* | 4/2002 | Busey et al. | 379/265.01 |
| 6,556,659 | B1* | 4/2003 | Bowman-Amuah | 379/9.04 |
| 6,564,209 | B1* | 5/2003 | Dempski et al. | 707/3 |
| 6,671,818 | B1* | 12/2003 | Mikurak | 714/4 |
| 6,801,929 | B1* | 10/2004 | Donoho et al. | 709/204 |
| 2002/0002546 | A1* | 1/2002 | Doerr et al. | 706/12 |
| 2002/0133328 | A1* | 9/2002 | Bowman-Amuah | 703/22 |
| 2004/0013253 | A1* | 1/2004 | Hogan et al. | 379/196 |

FOREIGN PATENT DOCUMENTS

| GB | 2 270 233 | 3/1994 |
|---|---|---|
| WO | WO 99/41720 | 8/1999 |

OTHER PUBLICATIONS

Paszkowsky I., "Details on Display," Telecom Report, Siemens Ag, Berlin, DE, vol. 20, No. 2, 1997, pp. 38-39, XP000199851.

* cited by examiner

*Primary Examiner*—Patrice Winder
(74) *Attorney, Agent, or Firm*—Sonnenschein Nath & Rosenthal LLP

(57) ABSTRACT

An information processing apparatus for replying to an inquiry from a customer in accordance with a reply priority and method therefore. In this information processing apparatus, the reply to the inquiry from the customer is done in accordance with the reply priority assigned to each of the inquiry. The reply priority is determined based on customer priority, contents of the inquiry and the repeated number of the inquiry remained unsolved.

12 Claims, 5 Drawing Sheets

INFORMATION PROCESSING APPARATUS HAVING REPLY PRIORITY AND METHOD THEREOF

CROSS REFERENCE TO RELATED APPLICATIONS

This application claims priority to Japanese Application No. P11-315901 filed on Nov. 5, 1999, which is incorporated herein by reference to the extent permitted by law.

BACKGROUND OF THE INVENTION

1. Field of the Invention

This invention relates to an information processing apparatus for replying to inquiries from customers in accordance with the reply priority assigned to each of the inquiries and method thereof. Further this invention relates to a recording medium readable by a computer apparatus and recorded a computer program for carrying out such information processing having reply priority.

2. Description of the Related Art

In recent years, various people become to use information terminals or personal computers owing to the remarkable development of the information processing industry field. As many people become to operate personal computers like this, many inquiries about operations of the personal computers are done to support centers of computer makers or computer shoppers from customers of these personal computers. In addition, even experts of computer system developer ask to these support centers in order to break off troubles upon development of computer system.

In the support center, such service to take care of inquiries including claims from the customers for general products such as personal computers are started by priority with payment. In case of replying to such inquiries from the customers by telephone, the number of telephone lines has to be increased depending on the priority for the inquiry. Namely, the number of reply stuffs is changed in accordance with the reply priority of the inquiry in the support center. Further in the support center, in consideration of impossibility of proper reply by a primary replier (help desk), a secondary replier having more technical knowledge is to be prepared. In such case, contents of the inquiry are directly delivered to the secondary replier after examined by the primary replier (help desk), and the secondary replier takes care of the contents of the inquiry.

But the inquiries to the support center increase year by year, and there are many cases where the primary replier cannot finish replying to all inquiries timely due to excess amount of the inquiries. In such case, some inquiries are also delivered to the secondary replier without examination by the primary replier, but the secondary replier also has many high technical inquiries to reply so that it is impossible for the secondary replier to reply to the inquiries properly and quickly by only delivering such inquiries directly from the primary replier to the secondary replier without priority information. In other words the secondary replier does not understand the reply priority of the contents of the inquiry and accordingly, as the result, the secondary replier does reply just in time series of the incoming inquiries.

The contents of the inquiry related to complaints that the secondary replier has to reply often include important and technically difficult matters that cannot be replied by the primary replier, so that if the reply to such inquiries takes time or includes mistakes, then these troubles and complaints become more complex.

SUMMARY OF THE INVENTION

Accordingly, in order to overcome the above mentioned problems, it is an object of the present invention to propose an information processing apparatus for replying to inquiries from customers in accordance with reply priority and method thereof. Further this invention relates to a recording medium recorded a computer program in readable form by a computer apparatus, wherein the computer program includes function for carrying out such reply processing with reply priority.

Accordingly a primary object of this invention is to present a reply system for replying to inquiries (information request) from customers and the reply system comprises a priority information storing means for storing information relating to reply priority; and a reply means for replying to the inquiry in consideration of the reply priority given to the inquiry.

A secondary object of this invention is to present a method for replying to inquiries from customers, wherein the method comprises the steps of: storing reply priority information upon replying to an inquiry assigned to each inquiry at every time when each of the inquiry is done; and replying to each of the inquiry in consideration of the reply priority information when the inquiry occurs.

A third object of the present invention is to present an information recording medium recorded a computer program readable by a computer, the program comprises the steps of: storing reply priority information upon replying to an inquiry assigned to each inquiry at every time when each of the inquiry is done; and replying to each of said inquiry in consideration of the reply priority information when the inquiry occurs.

A forth object of the present invention is to present an information transmitting medium for transmitting a computer program having function to reply to information, the computer program executes the steps of: storing priority information upon replying to the information assigned to each information at every time when each of the information is done; and replying to each of the information in consideration of the priority information when the information occurs.

Accordingly, according to the construction of this invention as described above, the reply priority information storing means stores information relating to reply priority upon reply corresponding to each of an inquiry from a customer. When the customer inquires to the help desk, the reply means replies to the inquiry from the customer in consideration of the reply priority assigned to the inquiry. Accordingly, the reply to the customer is done based on not in the inquiring order but based on the reply priority to be set to each of the inquiry. On this account if the reply priority is properly set to the inquiry, quick and proper reply is always possible to the customer who makes the inquiry. Further, even if an inquiry from the customer is important inquiry, a quick and adequate reply is done only by setting the reply priority of the inquiry of the priority information storing means.

DESCRIPTION OF THE PREFERRED EMBODIEMENTS

The following is one of suitable embodiments of this invention, and many desirable and technical restrictions are stated, but the scope of this invention is not limited to these configuration so long as there is not a mention in particular to limit this invention in the following discussion.

Figure 1:
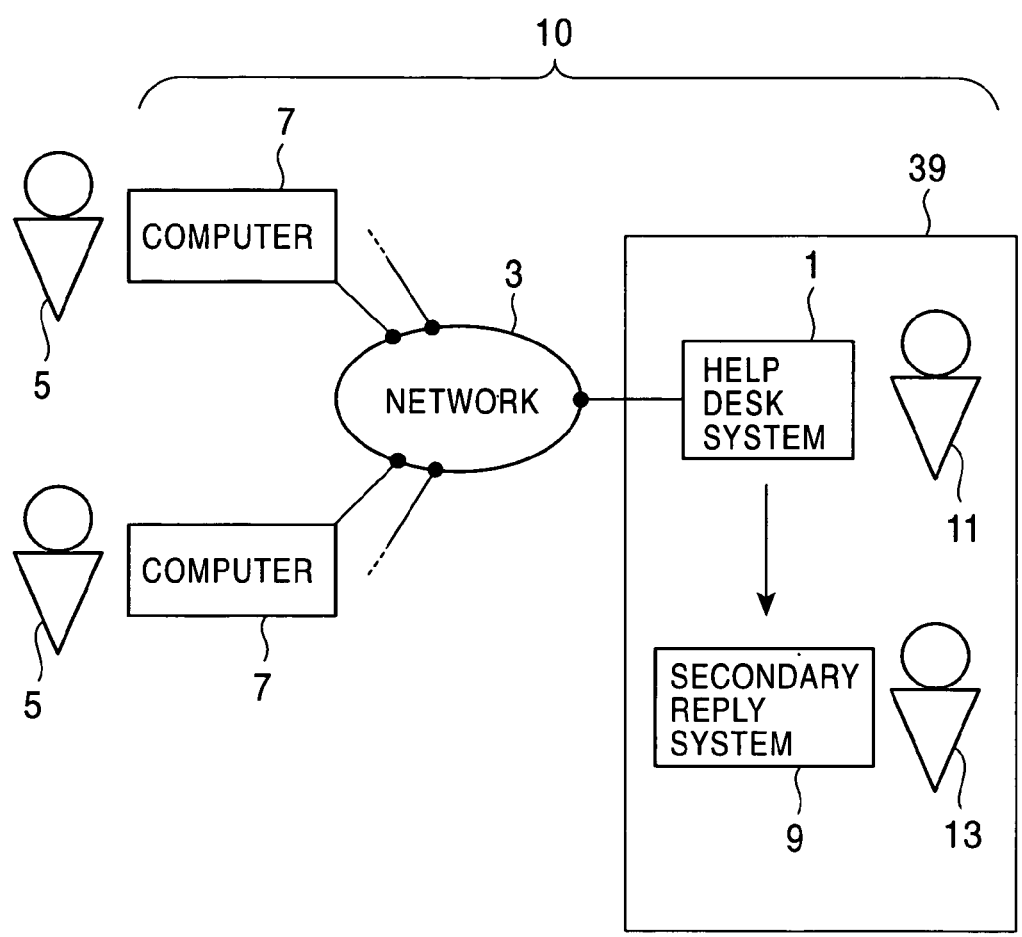
FIG. 1 is one embodiment of a system configuration of the present invention including a communication network.

FIG. 1 is a construction of an information reply system constituted based on a network system 10 including a help desk system 1 of this invention.

The network system 10 in FIG. 1 is one example of the configuration that a customer 5 does an inquiry to a help desk (primary replier) 11 through a network 3, for example, and alternatively a customer 5 may be asking to the help desk 11 directly at a support center or indirectly on the telephone, for example.

For example, the network system 10 has more than one computer 7, afore-mentioned network 3, the help desk system 1 and preferably a secondary reply system 9. This help desk system 1 and the secondary reply system 9 constitute a support center 39, for example.

The each computer 7 is a personal computer as one example of an electronic device (or apparatus) which the customer 5 uses. The electronic device (computer 7) mentioned here has a function to connect to the network 3 at least and to connect to the help desk system 1 for the inquiry. In the computer 7, in addition to a basic software such as an OS (Operating System) an application software such as an e-mail software to transmit and receive electronic mails, for example.

The customer 5 is a person who makes an inquiry about indistinct matter regarding the operation of his apparatus to the support center 39. Of course there are a plurality of customers 5 each having possibility for making inquiry to the support center 39. The contents of the inquiry (Information Request) and their importance are respectively different in every customer 5, and the replies should not be done in time sequence of the occurrence of the inquiries.

The network 3 may be an Internet, an Intranet or a LAN (Local Area Network), for example. The network 3 is connected to more than one computer 7, the help desk system 1 and the secondary reply system 9 through a predetermined transmission line. The network 3 is required only to be able to communicate data among electronic devices such as computers 7, the help desk system 1 and the secondary reply system 9, and a wireless data communication system is also available in stead of such wired network 3.

The help desk system 1 is a computer operated by the primary replier (help desk) 11 to reply to the inquiry from the customer 5. The help desk system 1 is a system to reply to the customer 5 who makes the inquiry by E-mail (Electronic mail), for example. In this help desk system 1, in addition to the basic OS, a software program for transmitting and receiving the E-mail, a database software program and a software program having a function for replying to the inquiry from the customer 5 are installed. In this case, the software program having the function for replying to the inquiry may include the database software program as above mentioned for managing such as appointed tables to be mentioned later. The software program having the function for replying to the inquiry is a software program for controlling an operation of the help desk system 1, for example. The help desk system 1 replies to a normal inquiry from the customer 5 and when the problem of the inquiry is technically difficult for solution at the help desk system 1, a notice for such difficult inquiry is transferred to the secondary replier 13 of the secondary reply system 9. In this case, the notice is reported to the secondary replier 13 with revised reply priority by the help desk 11. Accordingly the secondary replier 13 can reply precisely and quickly to the inquiry from the customer 5 in accordance with the revised reply priority.

A particular matter of this invention is that the reply priority information is included in the notice to be informed to the secondary replier 13 in addition to the contents of the inquiry. The reply priority mentioned here is assigned to each inquiry information requested from the predetermined customer 5 based on a customer priority assigned to each customer 5 and determines a reply order or reply priority. A rule for setting this reply priority is assigned to the help desk (primary replier) 11. For example, the contents of the inquiry from the customer 5 are examined by the help desk 11 at first, then the reply priority is determined, in consideration of the customer priority assigned to respective customer 5, based on the importance of the contents of the inquiry, the number of inquiries to the particular inquiry not replied yet, and the necessity of a quick response of the inquiry.

Next, the secondary reply system 9 is a system that is working on a computer operated by the secondary replier 13. In this secondary reply system 9, in addition to a basic software such as an OS, at least a software for transmitting and receiving the E-mail is working. The secondary reply system 9 is arranged in order to solve and to reply to the contents of the inquiry that are difficult to solve and to reply by the help desk 11. The secondary replier 13 recognizes through the secondary reply system 9 that there are inquiries that are not able to reply by the help desk 11 via the notice of the E-mail from the help desk system 1. Of course, it is needless to say that such notice may be done by oral or other way.

Figure 2:
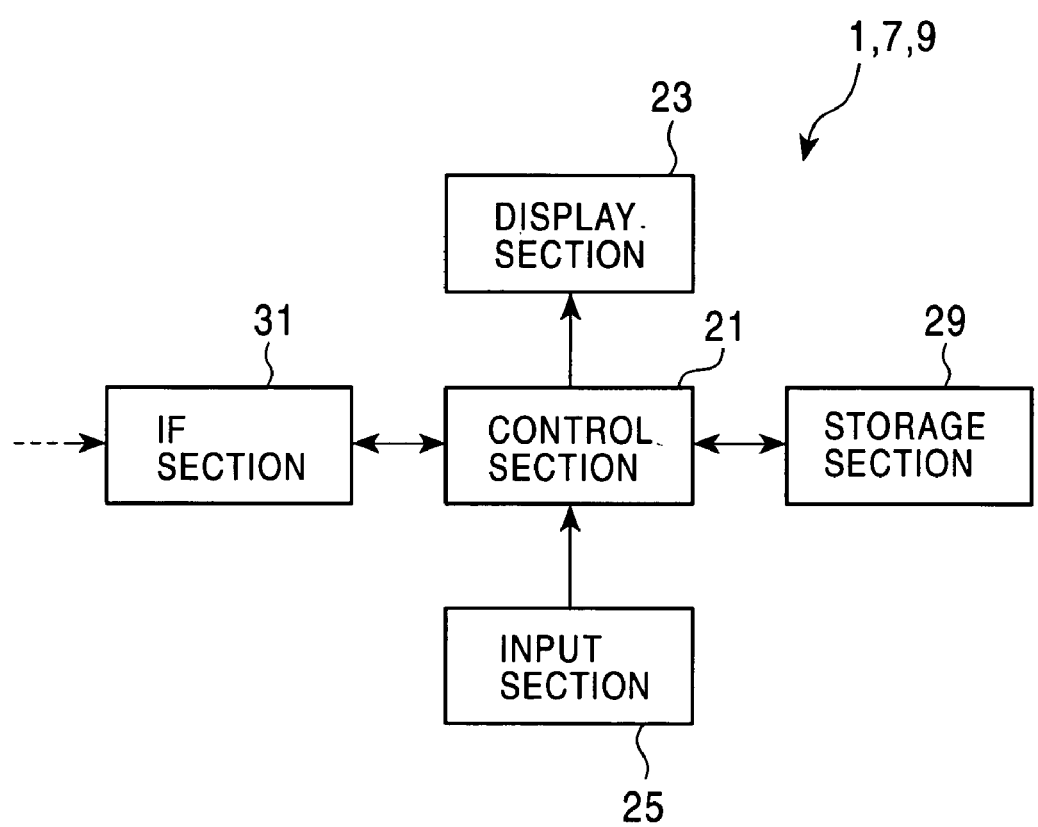
FIG. 2 is a general hardware configuration of a computer system applied to a help desk system, a secondary reply system and a computer of the customer.

FIG. 2 is a block diagram showing one example of a hardware construction of the help desk system 1 in FIG. 1. Because the computer 7 and the secondary reply system 9 are almost the same hardware constructions as that of the help desk system 1, so that the explanation of the computer 7 and the secondary reply system 9 are omitted and only the help desk system 1 is explained as one representative example of these computer 7, the help desk system 1 and the secondary reply system 9 in the following discussion. For example, the help desk system 1 has a control section 21, a display section 23, an input section 25, a storage section 29 and an IF (Inter-Face) section 31.

The control section 21 is connected to the display section 23, the input section 25, the storage section 29 and the IF (Interface) section 31, respectively. The control section 21 includes a CPU (Central Processing Unit), for example, and the control section 21 controls the display section 23, the input section 25, the storage section 29 and the IF section 31 to be connected thereto. The display section 23 is a liquid crystal display or a CRT (Cathode Ray Tube) display, for example. The input section 25 includes an information entering device such as a keyboard or a mouse or something like that. The storage section 29 is a magnetic recording disc device such as hard disc system as a large scale recording apparatus and stores data for the above mentioned database. In this case, the storage section 29 may be information recording medium such as an optical disc or a magneto-optical disc other than above. In addition, for example, the storage section 29 may contain a semiconductor memory as working area of the control section 21 and as working area of each of the above mentioned respective programs. The IF section 31 includes a network interface card, for example, and has a function to connect the help desk system 1 to the network 3.

Figure 3:
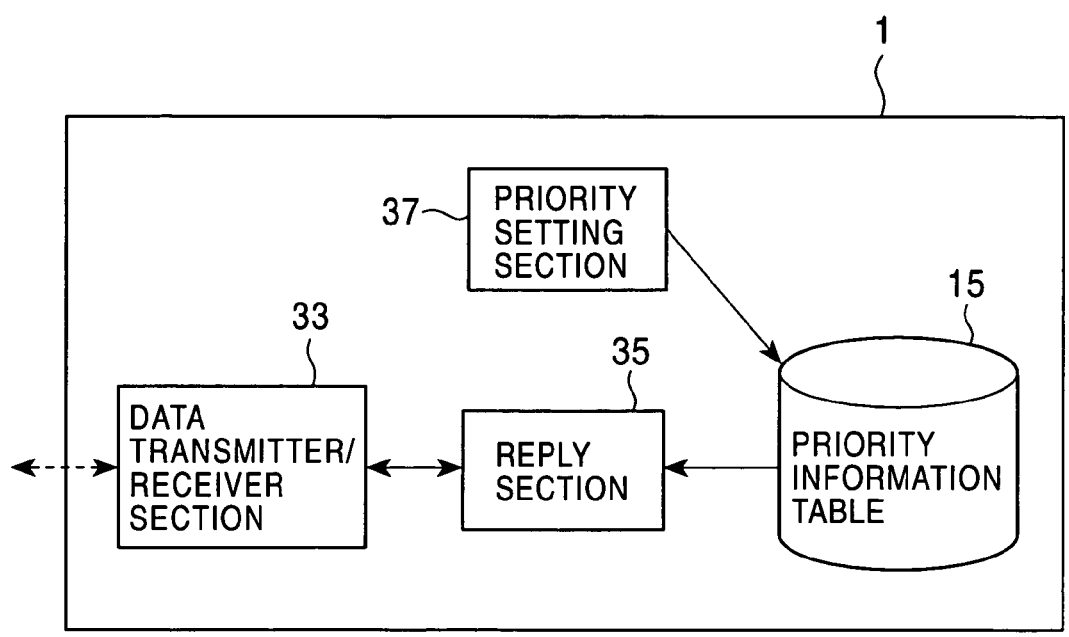
FIG. 3 is a software configuration for the help desk system and the secondary reply system in a support center.

FIG. 3 is a system configuration showing one example of the help desk system 1 in FIG. 1. The help desk system 1 has a priority information table 15, a reply priority setting section 37, a reply section 35 and a data transmitter/receiver section 33. In the priority information table 15, a priority information relating to the customer priority assigned to each of registered customer and reply priority upon replying to the inquiry done by the customer 5 who takes predetermined registration are stored. The customer 5 who is not registered in the priority information table 15 can not receive the support service. The reply priority setting section 37 can set the reply priorities to every inquiries based on the customer priority, and the priority information 15a including the reply priorities is stored the priority information table 15. In this case, the priority setting section 37 may set the reply priority to each of the contents of the inquiry, for example.

The reply section 35 works by operation of the help desk 11, and replies to the inquiry based on the reply priority as stated above, for example. To be more concrete, the reply section 35 searches corresponding examples stored in the inquiry information managing section 17 (to be explained later) based on the contents of the inquiry as a search key.

The data transmitter/receiver section 33 includes the E-mail software, for example, executes communications between the inquiring customer 5 and transmits thus obtained reply to the customer 5. The network system 10 including the help desk system 1 is configured as mentioned above, and reply method for such inquiry is explained next with reference to FIGS. 1 to 5.

Figure 4:
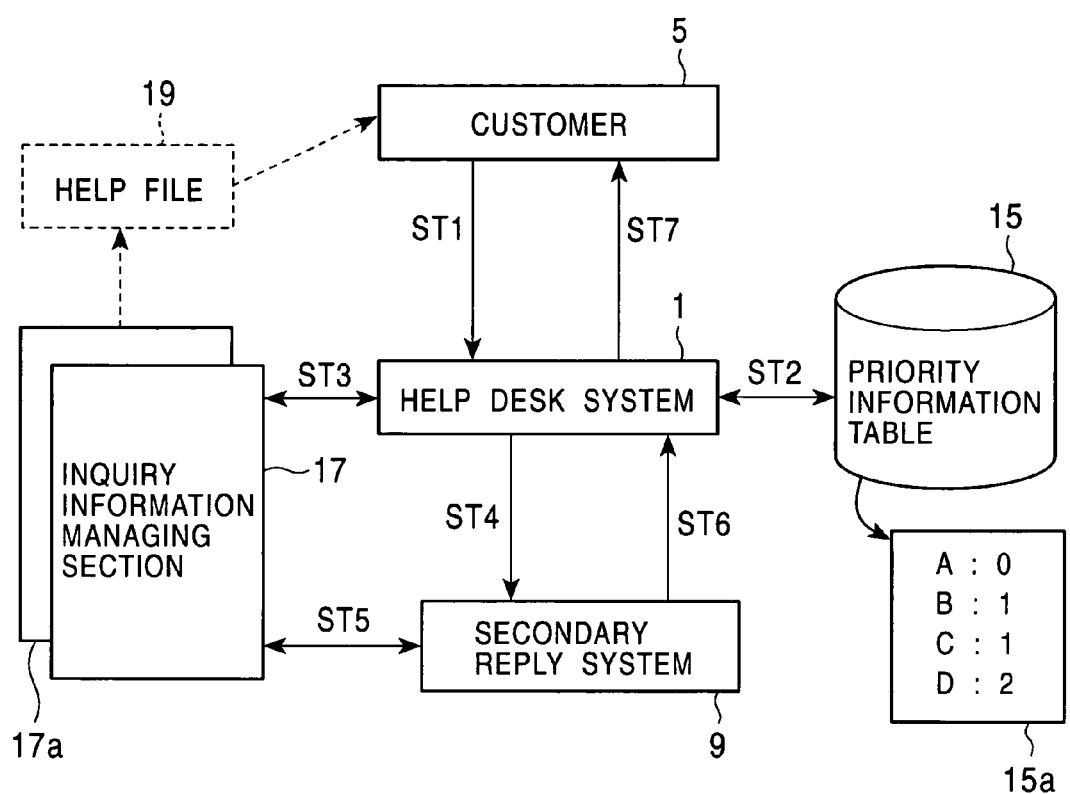
FIG. 4 is a flow chart showing operation of the help desk system and the secondary reply system in a support center.
Figure 5:
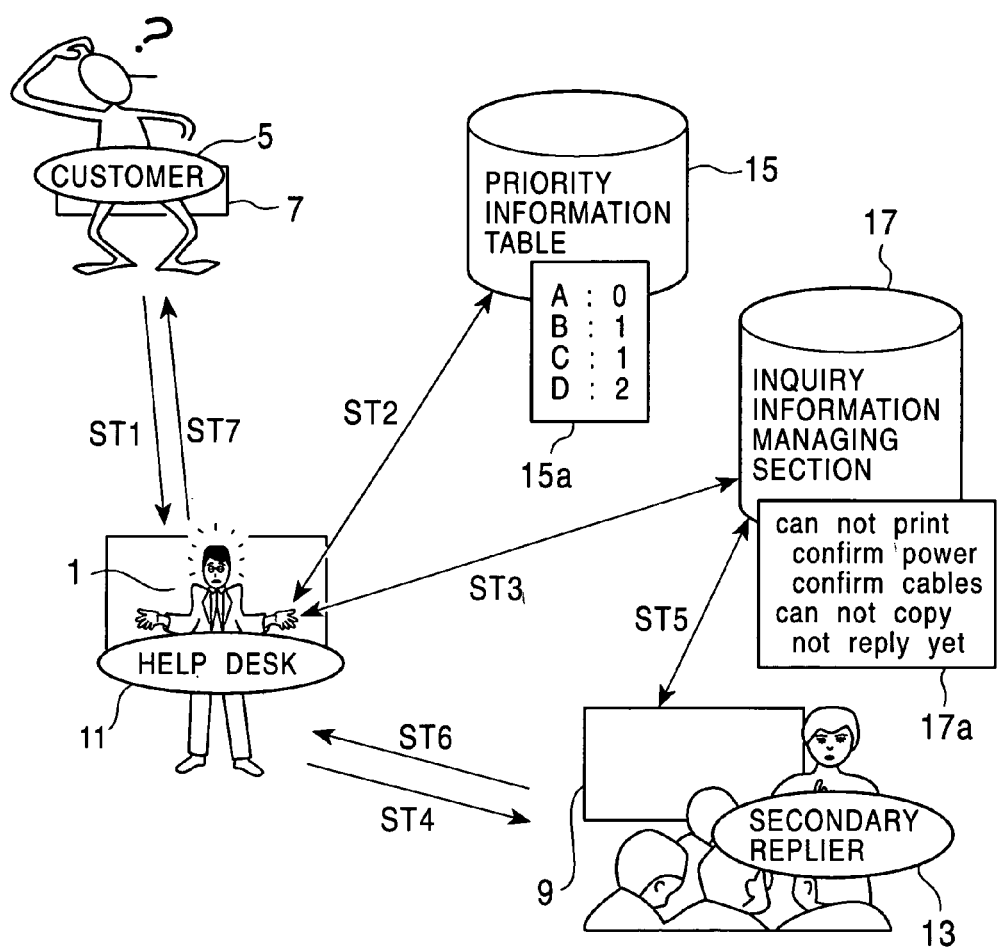
FIG. 5 is a processing concept showing the operation of the help desk system and the secondary reply system in a support center.

FIG. 4 is one example of the flowchart in which the customer 5 does an inquiry to the help desk 11, and FIG. 5 is an image figure for showing one example of work process in which the customer 5 does an inquiry to the help desk 11.

For example, the customer 5 purchases an electronic device of a specified maker, and becomes a user of the electronic device. Operations of the recent electronic device becomes more complex and difficult while being equipped with high performances, and accordingly the customer 5 has to frequently inquire to the support center 39 of the specified maker of the electronic device. In such cases, there is the case that on the other hand operating instruction is difficult that an electronic device becomes high performance of late years, The help desk system 1 is arranged in the support center 39 in order to reply to such inquiry from the customer 5. In addition, a secondary reply system 9 together with a secondary replier 13 is further provided in the support center 39 in order to reply to the inquiry that cannot be replied by the help desk (primary replier) 11 due to the difficulty of the inquiry. The customer 5 asks to the help desk 11 by the E-mail, for example, at an inquiry step ST1. Such inquiry from the customer 5 may be done by telephone or directly at a reception desk of the support center 39.

In the help desk system 1, the help desk 11 searches the customer of the inquiry in the priority information table 15, and judges if the customer 5 is a registered customer in the priority information table 15 at a confirmation step ST2. And if the customer is the registered customer, the registration of the customer 5 is confirmed and if it is not, the customer 5 is noticed that he or she is not a registered customer and ask to register by taking a predetermined registration procedure. As shown in FIG. 4, the help desk 11 searches the inquiry information 17a stored in the inquiry information management section 17 with the contents of the inquiry from the customer 5 as a search key, and further the help desk 11 registers such contents of the inquiry from the customer 5 in the inquiry information 17a at search & adding step ST3. The inquiry information management section 17 may consist of an intranet bulletin board working in the computer of the help desk system 1, for example. This intranet bulletin board may be constituted by a group ware system or a World Wide Web (WWW) system, for example.

The inquiry information management section 17 stores and manages the inquiry information 17a and supplies the solution method included or stored in the inquiry information 17a in response to the inquiry from the help desk 11. The inquiry information management section 17 stores the inquiry information 17a including past settled solution method and a history of the inquiry.

Namely, at first the help desk 11 inquires to the inquiry information 17a and searches the past inquiry, and if there is the same inquiry in the past, the same solution registered in the inquiry information 17a is reported to the customer 5 as a reply. For example, the reply "confirm power supply" or the reply "confirm a cable" in the inquiry information 17a is reported or notified to the customer 5 through the help desk 11 as a reply for the inquiry "cannot print" in FIG. 5. If there is the same inquiry in the inquiry information 17a but no solution is registered, this means that the reply to the previous inquiry is not answered yet. Namely this corresponds to a "not replied yet" for the inquiry "cannot copy" in the inquiry information 17a in FIG. 5, for example.

The reply priority to the inquiry is determined by a calculation rule as shown below at the reply section 35 in FIG. 3. As a numeric value becomes larger, the priority in FIGS. 4 & 5 has higher priority.

The reply priority is calculated by only adding each customer priority assigned to each of the inquiry information from a generally registered customer or a specially registered customer in a first example of the priority calculation rule. As shown in FIG. 4, each customer has own customer priority point as stored in the priority information 15a. Suppose the customer is "A" and "B" in FIGS. 4 & 5 and both customers A and B ask the same contents of the inquiry, for example. In this case the reply priority to the contents of this inquiry is calculated as 0+1=1. In addition, the reply priority becomes 1+1=2 if, for example, if those customer are "B" and "C". Further in the case where the same content of the inquiry are transmitted by customers "B", "C" and "D", and received by the primary replier 11, the calculated reply priority becomes 4 by the calculation 1+1+2=4. Accordingly among three examples, the last case has the highest reply priority and should be replied at first among three cases.

In a second example of the priority calculation rule, the reply priority is changed in accordance with each priority assigned to each of the inquiry information from a general customer or a specified customer and the order of the same contents of the inquiry done to the support center 39.

Suppose the customer is "A" and "B" in FIGS. 4 & 5 and the customer "B" asks the same contents of the inquiry after the customer "A", for example. In this case the reply priority of the contents of the inquiry is calculated as (customer priority for the customer "A")×1 (first inquiry)+(reply priority for the customer "B")×2 (second inquiry)=0×1+1×2=2.

In addition, if the customer "C" asks the same contents of the inquiry after the customer "B", for example. In this case the reply priority of the contents of the inquiry is calculated as (customer priority for the customer "B")×1 (first inquiry)+(customer priority for the customer "C")×2 (second inquiry)=1×1+1×2=3. Further if the customers "B", "C" and "D" inquire the same contents to the support center 39 in this order, the finally determined reply priority becomes 1+1×2+2×3=9. Accordingly among three examples, the last case has the highest reply priority and should be replied at first among three.

In addition, in the another case for the priority calculation rule, the reply priority may be determined based on a company or a department of a company to which the customer belongs. Further in this case, the inquiry from the same company and the department may not be considered in calculating the reply priority. As further another example of the calculation rule of the reply priority, an inquiry route (E-mail, Telephone, etc) of the inquiry and the time of day of the inquiry may be considered when deciding the reply priority. The help desk 11 notifies to the secondary replier 13 the search result (for example, the contents of the inquiry and the reply priority thereof) at a notice step ST4 if the notice is necessary. The notice is done or is not done in the following manner.

(1) The notice to the secondary replier 13 is necessary.
When a new inquiry for the secondary replier 13 is done.
When the customer 5 of higher priority asked the same inquiry which is not replied yet.
(2) The notice to the secondary replier 13 is not necessary.
When the reply priority for the inquiry does not change greatly as a result that customer 5 having low customer priority newly does an inquiry to the same inquiry already registered but not replied yet.

When the above described new inquiry is done, the help desk 11 writes on the intranet bulletin board about the inquiry from the customer 5 and notifies to the secondary replier 13 the calculated reply priority of the inquiry. The secondary replier 13 who is informed the inquiry from the help desk 11 confirms the inquiry and prepares a reply to the inquiry at a confirmation & reply step ST5.

When the secondary replier 13 finds a solution for the inquiry, the solution for the inquiry is written in the inquiry information management section 17. Further the secondary replier 13 informs to the help desk 11 who transfers the inquiry at a reply step ST6. Then, the help desk 11 refers to the history of inquiry information managed in the inquiry information management section 17, and report it to the customer 5 who does the inquiry at a reply step ST7. When there is another customer who does the same inquiry in addition, the reply is also served to such another customer.

According to above described embodiment of this invention, following effects can be expected. For example, according to the above described embodiment of the present invention, the customer 5 can obtain necessary information not in the order of the inquiring sequence but based on the calculated reply priority. On this account if appropriate reply priority is set and stored in the priority information table 15, the customer 5 can receive a quick and appropriate reply to his or her inquiry from the support center 39. For example, even if the inquiry from the customer 5 is very important inquiry, such inquiry is also replied quickly and adequately only by properly setting the reply priority of the priority information table 15.

In addition, according to above described embodiment of the present invention, the reply priority of the priority information table 15 is set and revised by the reply priority setting section 37, the reply to the customer 5 is done quickly and adequately. Of course the reply section 35 checks whether the customer 5 of the inquiry is a registered customer in the priority information table 15, and the reply is done only to the registered customer.

Further according to above described embodiment of the present invention, the reply section 35 acquires the solution method stored in the priority information table 15 when there occurs an inquiry from an arbitrary customer. Then replies to the customer using thus acquired solution method. Accordingly the any registered customer 5 can receive the proper reply that is appropriate as well for the inquiry.

In addition, according to the above described embodiment of the present invention, if the reply section 35 judges that a solution method for the inquiry from the customer is not stored in the priority information table 15, the reply priority of the inquiry from the customer 5 is changed and thus revised reply priority is notified to the secondary reply system 9 with the contents of the inquiry by way of the reply section 35 and the data transmitter/receiver section 33 controlled by the reply section 35. Accordingly the secondary reply system 9 can reply quickly with appropriate order after having recognized reply priority of the customer 5.

According to the present invention:
1) The support center 39 can reply to the inquiry from the customer 5 without increasing the number of the help desk 11 by assigning customer priority to each customer 5; and
2) The help desk system 1 can alter the reply priority of the inquiry in accordance with the number of the customers 5 doing the same inquiry.

Accordingly, the help desk system 1 of the present invention can reply to the inquiry from the customer 5 quickly and appropriately.

By the way, this invention is not limited to the embodiment as mentioned above. For example, the help desk 11 regularly generates the inquiry information 17a accumulated in the inquiry information management section 17 as a help file 19 as shown in FIG. 4. Thus generated help file may be regularly distributed to some or all of the customers. In this case the help desk system 1 may regularly distribute the help file 19 reflected the history of the inquiry, solution methods for the inquiry and the number of the same inquiry.

The information such as the priority or the number of times for the same inquiry may be reflected to a reply priority for search using the help file 19. In other words this information may be used as a reference to coordinate position of information as hardware-like data alignment in case of searching.

The program having inquiry reply function as described above may be stored in an information recording medium such as a flexible magnetic disc, a CD (Compact Disc: trademark) or a DVD (Digital Versatile Disc). In addition, the above mentioned program may be recorded in an information recording medium installed in a computer as an electronic appliance connected to a transmission medium (either cable or wireless) as a network, and the program is downloaded to a computer as an electronic appliance of the customer through the network.

What is claimed is:
1. An information processing apparatus for replying to an inquiry from customers comprising:
 means for storing a customer priority for each customer in a customer priority information table;

means for assigning a reply priority to said inquiry according to said customer priority information table;

means for determining whether a solution to said inquiry is stored;

means for replying to said inquiry based on said reply priority;

means coupled to said replying means for storing past and new inquiries together with their solutions to respective inquiry; and means for notifying an other reply means, wherein when said inquiry is already stored but the solution for said inquiry is not stored in said past and new inquiry storing means, the reply priority for the inquiry is revised to be higher value and thus revised reply priority is transferred to said other reply means together with said inquiry.

2. An information processing apparatus as claimed in claim 1, further comprising:

means coupled to said assigning means for setting said reply priority to said inquiry upon reception.

3. An information processing system, comprising:

an electronic device for transmitting/receiving information;

a communication network to be coupled to said electronic device for communicating said information to one of a plurality of customers requesting said information;

means for storing a customer priority for each of the plurality of customers in a customer priority information table;

means for assigning a reply priority to the request for said information according to said customer priority information table;

means for determining whether a result of processing relating to said information is stored; and reply means coupled to said communication network for executing said processing relating to said information based on said reply priority if said determining means determines that the result is not stored and for transmitting the result of said processing to said electronic device by way of said communicating network;

wherein when the solution for said information is not stored in said solution storing means, the reply priority for the information is revised and thus revised reply priority is supplied to said reply means.

4. An information processing system as claimed in claim 3, further comprising:

means coupled to said reply means for setting priority upon replying to a received information.

5. An information processing system as claimed in claim 3, further comprising:

means coupled to said reply means for storing solutions for the received information.

6. An information processing system, comprising:

an electronic device for transmitting/receiving information;

a communication network to be coupled to said electronic device for communicating said information from said electronic device to one of a plurality of customers requesting said information;

means for storing a customer priority for each of the plurality of customers in a customer priority information table;

means for assigning a reply priority to the request for said information according to said customer priority information table;

means for determining whether a result of processing relating to said information is stored;

a first reply means coupled to said network for executing said processing relating to said information based on said reply priority if said determining means determines that the result is not stored and for transmitting the result of said processing to said electronic device by way of said communicating network; and a second reply means coupled to said first reply means for processing related to said information transferred from said first reply means and for transferring thus processed result to said first reply means;

wherein when said information is already received but is remained unsolved, the reply priority for the information is revised to be higher value at said first reply means.

7. An information processing system as claimed in claim 6, wherein said electronic device is a computer device.

8. An information processing system as claimed in claim 6, wherein said electronic device is a telephone device.

9. Method for processing information having priority concept comprising the steps of:

storing a customer priority for a plurality of customers in a customer priority information table;

receiving an inquiry from one of said plurality of customers;

assigning a reply priority to said inquiry according to said customer priority information table;

determining whether a solution to the inquiry is stored;

replying to said inquiry based on said reply priority; revising the reply priority for the information when the solution for the information is not stored in said solution storing means; and supplying said revised reply priority to said replying means.

10. Method for processing information as claimed in claim 9, further comprising the step of:

setting said reply priority upon replying to an inquiry by priority setting means.

11. A computer-readable medium containing instructions to perform a method comprising the steps of:

storing a customer priority for a plurality of customers in a customer priority information table;

receiving an inquiry from one of said plurality of customers;

assigning a reply priority to said inquiry according to said customer priority information table;

determining whether a solution to the inquiry is stored;

replying to said inquiry based on said reply priority;

revising the reply priority for the information when the solution for the information is not stored in said solution storing means; and supplying said revised reply priority to said replying means.

12. A computer-readable medium as claimed in claim 11, said method further comprising the step of:

setting said reply priority upon replying to an inquiry by priority setting means.

* * * * *